US012732592B2

(12) United States Patent
Wang et al.

(10) Patent No.: US 12,732,592 B2
(45) Date of Patent: Sep. 8, 2026

(54) VIRTUAL IMAGE VIDEO CALL METHOD, TERMINAL DEVICE, AND STORAGE MEDIUM

(71) Applicant: HUIZHOU TCL CLOUD INTERNET CORPORATION TECHNOLOGY CO. LTD, Huizhou (CN)

(72) Inventors: Yali Wang, Huizhou (CN); Wanfu Zhou, Huizhou (CN)

(73) Assignee: HUIZHOU TCL CLOUD INTERNET CORPORATION TECHNOLOGY CO. LTD, Huizhou (CN)

( * ) Notice: Subject to any disclaimer, the term of this patent is extended or adjusted under 35 U.S.C. 154(b) by 155 days.

(21) Appl. No.: 18/579,842

(22) PCT Filed: Jul. 11, 2022

(86) PCT No.: PCT/CN2022/104964
§ 371 (c)(1),
(2) Date: Jan. 16, 2024

(87) PCT Pub. No.: WO2023/016167
PCT Pub. Date: Feb. 16, 2023

(65) Prior Publication Data

US 2024/0179272 A1 May 30, 2024

(30) Foreign Application Priority Data

Aug. 9, 2021 (CN) ......................... 202110908844.6

(51) Int. Cl.
*H04N 7/15* (2006.01)
*G06T 13/80* (2011.01)
(Continued)

(52) U.S. Cl.
CPC ............. *H04N 7/157* (2013.01); *G06T 13/80* (2013.01); *G06T 15/00* (2013.01); *G06V 40/172* (2022.01); *G06V 40/20* (2022.01)

(58) Field of Classification Search
None
See application file for complete search history.

(56) References Cited

U.S. PATENT DOCUMENTS 9,996,940 B1 * 6/2018 Yamasaki ............... G06T 11/00
10,904,488 B1 * 1/2021 Weisz ................. G06V 10/774
(Continued)

FOREIGN PATENT DOCUMENTS

CN 105516638 A 4/2016
CN 105554429 A 5/2016
(Continued)

OTHER PUBLICATIONS

PCT International Search Report for International Application No. PCT/CN2022/104964, mailed on Sep. 21, 2022, 6pp.
(Continued)

*Primary Examiner* — Duc Nguyen
*Assistant Examiner* — Assad Mohammed
(74) *Attorney, Agent, or Firm* — The Roy Gross Law Firm, LLC; Roy D. Gross

(57) ABSTRACT

Provided by the present invention is a virtual image video call method, comprising: detecting the network quality index in a video call process; determining whether the network quality indicator of the current video call satisfies a predetermined condition; if detected that the network quality indicator of the current video call satisfies the predetermined condition, controlling the acquisition of a pre-generated virtual image of a call user; and switching the current video call interface to the virtual image on which user behavior is mapped, and carrying out display.

19 Claims, 3 Drawing Sheets

(51) Int. Cl.

| | |
|---|---|
| ***G06T 15/00*** | (2011.01) |
| ***G06V 40/16*** | (2022.01) |
| ***G06V 40/20*** | (2022.01) |

(56) References Cited

U.S. PATENT DOCUMENTS

2014/0176662 A1* 6/2014 Goodman ............... H04W 4/21 348/14.07
2015/0350451 A1* 12/2015 Aue ........................ G06F 40/58 379/202.01
2016/0100329 A1* 4/2016 Miller ................... H04L 1/0014 370/235
2018/0249113 A1* 8/2018 Faulkner .............. G11B 27/002
2018/0332178 A1* 11/2018 Ni ....................... H04N 21/4524
2019/0268467 A1* 8/2019 Wang .................... H04W 76/14
2021/0056376 A1* 2/2021 Panayiotou ............ G06F 3/167
2021/0350604 A1 11/2021 Pejsa et al.
2022/0051412 A1* 2/2022 Gronau ................ G06V 40/172
2022/0264002 A1* 8/2022 Imai ........................ G06F 13/10

FOREIGN PATENT DOCUMENTS

CN 107911644 A 4/2018
CN 109936774 A 6/2019
CN 112165598 A 1/2021
CN 112672388 A 4/2021
CN 113838178 A 12/2021
KR 20040103047 A 12/2004

OTHER PUBLICATIONS

PCT Written Opinion of the International Searching Authority for International Application No. PCT/CN2022/104964, mailed on Sep. 21, 2022, 8pp.

Chinese Office Action issued in corresponding Chinese Patent Application No. 202110908844.6 dated Aug. 12, 2024, pp. 1-11, 31pp.

* cited by examiner

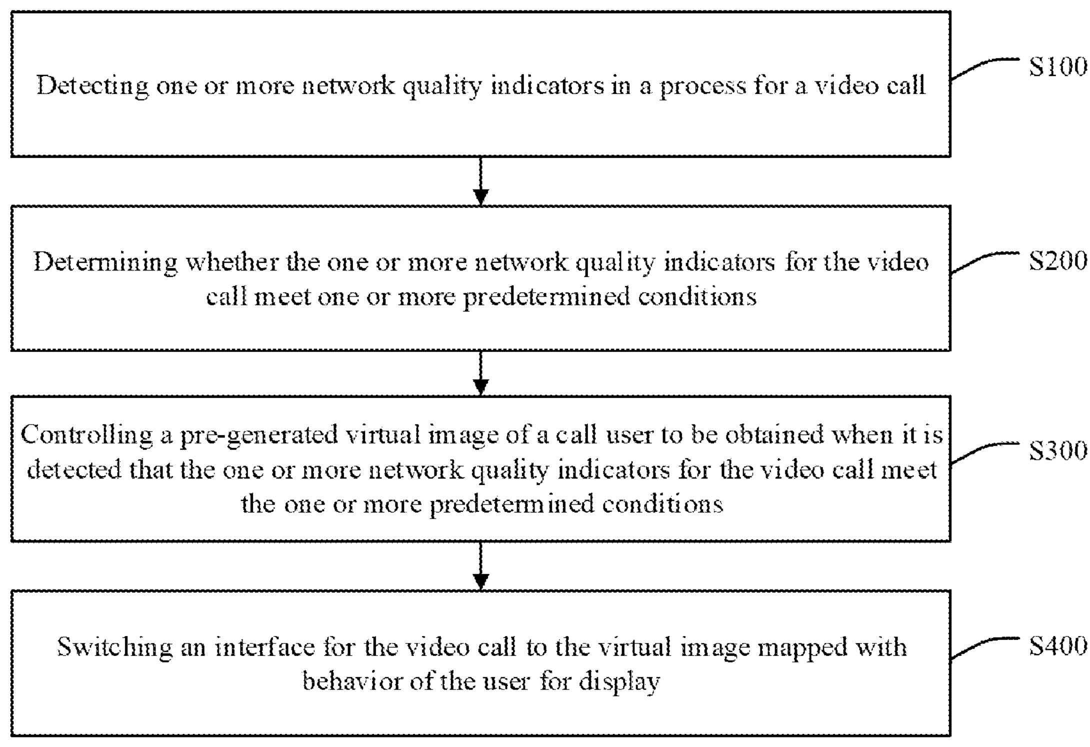

FIG. 1

Detecting whether an instruction for making a video call using a virtual image is received when it is monitored that a video call request is received or transmitted

A100

Invoking or generating the virtual image when it is detected that the instruction for making the video call using the virtual image is received, and mapping behavior of the user into the virtual image

A200

Displaying the virtual image mapped with the behavior of the user in a picture of the video call when it is detected that the video call is successfully established

VIRTUAL IMAGE VIDEO CALL METHOD, TERMINAL DEVICE, AND STORAGE MEDIUM

This application claims priority to Chinese Patent Application No. 202110908844.6, filed with the Chinese Patent Office on Aug. 9, 2021, entitled "VIRTUAL IMAGE VIDEO CALL METHOD, TERMINAL DEVICE, AND STORAGE MEDIUM", the disclosure of which is incorporated herein by reference in its entirety.

TECHNICAL FIELD

The present disclosure relates to the field of mobile terminals, and more particularly, to a virtual image-based video call method, a terminal device, and a storage medium.

BACKGROUND

In a conventional video call, when a network signal is poor or the network signal fluctuates greatly, the video call of the user is stalled, which affects the use experience.

SUMMARY

Technical Problems

A conventional solution is to reduce a transmission data stream by cropping a face, reducing a bit rate, and performing an image difference. However, reducing of the transmission data stream means that a transmitted picture is missing, a clear and smooth picture cannot be transmitted, and a requirement of a user for smoothness and clarity of a video call cannot be met.

Accordingly, an improvement and a development is needed for defects existing in the related art.

Solutions to Problems

Technical Solutions

In view of the above drawbacks of the related art, technical problems to be solved by the present disclosure are to provide a virtual image video call method and apparatus, a terminal device, and a storage medium.

In order to solve the above technical problems, the present disclosure adopts technical solutions as follows.

A virtual image video call method is provided, including:

detecting one or more network quality indicators in a process for a video call;

determining whether the one or more network quality indicators for the video call meet one or more predetermined conditions;

when it is detected that the one or more network quality indicators for the video call meet the one or more predetermined conditions, controlling a pre-generated virtual image of a call user to be obtained; and switching an interface for the video call to the virtual image mapped with behavior of the user for display.

In the virtual image video call method, the method further includes: before detecting of the one or more network quality indicators, presetting one or more predetermined conditions for the one or more network quality indicators, and when it is detected in the process for the video call that a network state for the video call meets the predetermined conditions, controlling an interface for the video call to be switched to the virtual image for display; and presetting the virtual image used for the video call when the one or more network quality indicators meet the one or more predetermined conditions.

In the virtual image video call method, the determining of whether the one or more network quality indicators for the video call meet the one or more predetermined conditions includes:

the one or more network quality indicators comprising a network speed, a packet loss rate, and a delay, detecting at least one of: whether the network speed is lower than a first value, whether the packet loss rate is higher than a second value, or whether the delay is higher than a third value.

In the virtual image video call method, the controlling the pre-generated virtual image of the call user to be obtained includes:

when at least one of following items is detected: the network speed is lower than the first value, the packet loss rate is higher than the second value, or the delay is higher than the third value, controlling the pre-generated virtual image of the call user to be invoked.

In the virtual image video call method, the switching of the interface for the video call to the virtual image includes:

switching an interface for the video call to a virtual image for display;

capturing behavior of a user through at least one of a camera or a sound sensor of a mobile terminal; and mapping the behavior of the user into the virtual image for display.

In the virtual image video call method, the detecting of the one or more network quality indicators includes:

detecting the one or more network quality indicators in the process for the video call in real time or at a fixed interval.

In the virtual image video call method, the one or more predetermined conditions are set by a user based on a usage habit and a usage feeling.

In the virtual image video call method, the method further includes: before the controlling of the pre-generated virtual image of the call user to be obtained, recognizing a face of each of one or more call users currently performing the video call is recognized to check whether the call user has respective one of preset virtual images; in response to the call user having the preset virtual image, invoking the preset virtual image directly; and in response to the call user not having the preset virtual image, allocating a template virtual image to the call user for the video call.

In the virtual image video call method, the method further includes: in response to the call user not having the preset virtual image, generating and storing a virtual image including one or more appearance features of the call user by an algorithm based on to appearance information of the call user captured by a camera of a terminal, to enable the call user to invoke the preset virtual image of the call user when the call user makes the video call again later.

In the virtual image video call method, the method further includes: after the switching of the interface for the video call to the virtual image includes:

detecting one or more network quality indicators in a process for a virtual image call, and when the one or more network quality indicators are restored to normal values continuously for a preset time period, switching the virtual image to the interface for the video call.

A virtual image video call switching method is provided, including:

detecting whether an instruction for making a video call using a virtual image is received when it is monitored that a video call request is received or transmitted;

invoking or generating the virtual image when it is detected that the instruction for making the video call using the virtual image is received, and mapping behavior of the user into the virtual image; and displaying the virtual image mapped with the behavior of the user in a picture of the video call when it is detected that the video call is successfully established.

In the virtual image video call switching method, the method further includes: before monitoring receiving or transmitting of the video call request, presetting a virtual image for the video call or presetting an algorithm for automatically generating the virtual image based on one or more appearance features of the user.

In the virtual image video call switching method, the displaying of the virtual image mapped with the behavior of the user includes:

after it is detected that the video call is successfully established, controlling a sound sensor to capture a sound of the user, and recognizing a mouth shape corresponding to the sound and an emotion of the user when speaking by a speech recognition algorithm; and controlling the recognized mouth shape and emotion to be mapped into a face action of the virtual image for display.

A terminal device is provided, including: a memory, a processor, and a virtual image video call program stored on the memory and operable on the processor, where the virtual image video call program, when executed by the processor, implements steps of any of the virtual image video call methods described above.

A computer readable storage medium is provided, having stored a virtual image video call program thereon which, when executed by a processor, causes the processor to perform steps of any of the virtual image video call methods described above.

BENEFICIAL EFFECTS OF THE PRESENT DISCLOSURE

Beneficial Effects

Compared with the related art, the present disclosure compares the one or more network quality indicators automatically detected in the video call with one or more preset conditions of the preset network quality indicators, and switches the interface for the video call to an interface on which the virtual image is displayed when the comparison result indicates that the current network quality is poor. The interface on which the virtual image is displayed can map the behavior of the user, such as the expression, the mouth shape, and the limb action, into the virtual image, and have a high image quality while maintaining a low data transmission amount, so that a clear and high-quality video communication experience can be obtained when a network is poor.

BRIEF DESCRIPTION OF THE DRAWINGS

Description of the Drawings

In order to more clearly illustrate the technical solutions in embodiments of the present disclosure, the accompanying drawings depicted in the description of the embodiments will be briefly described below. It will be apparent that the accompanying drawings in the following description are merely some embodiments of the present disclosure, and other drawings may be obtained from these drawings without creative effort by those skilled in the art.

FIG. 1 is a flowchart of a specific implementation of a virtual image video call method according to some embodiments of the present disclosure.

FIG. 2 is a flowchart of a specific implementation of a method for switching a virtual image video call according to some embodiments of the present disclosure.

Figure 3:
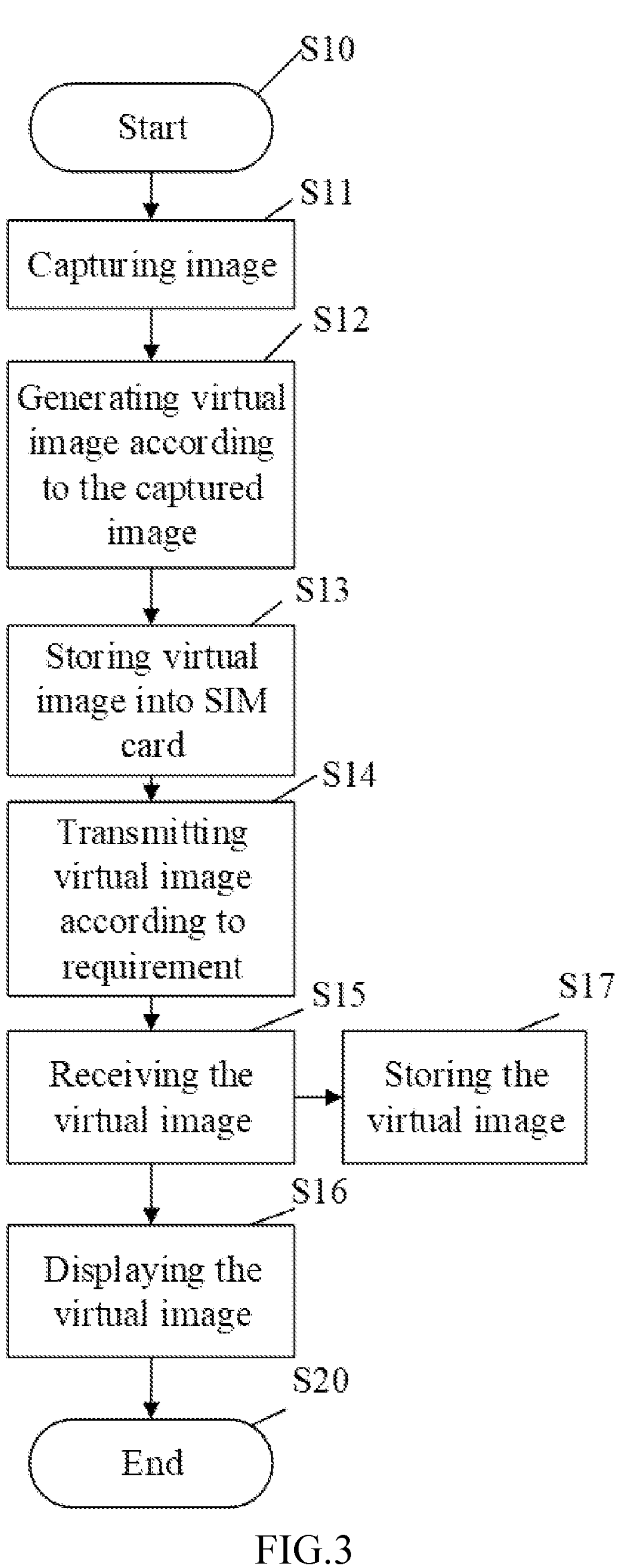

FIG. 3 is a schematic flow diagram of a third embodiment of the present disclosure.

Figure 4:
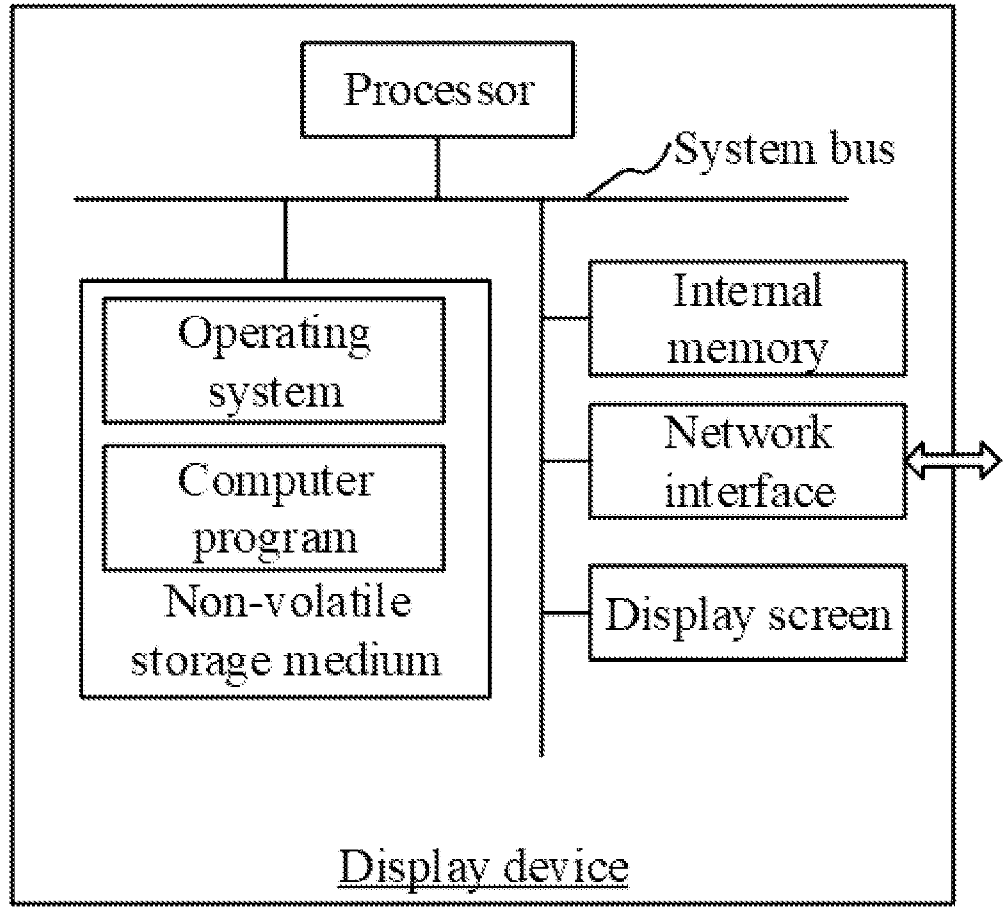

FIG. 4 is a schematic diagram of an internal structure of a terminal device according to some embodiments of the present disclosure.

EMBODIMENTS OF THE PRESENT DISCLOSURE

Detailed Description

To make the objectives, technical solutions, and advantages of the present disclosure more clear and definite, the present disclosure is illustrated in detail below by referring to the accompanying drawings and illustrating the embodiments. It should be understood that the specific embodiments described here are only used to explain the present disclosure, and are not used to limit the present disclosure.

It should be noted that all directional indications (such as up, down, left, right, front, back, etc.) in the embodiments of the present disclosure are only intended to explain a relative positional relationship, a motion situation, and the like between components in a particular pose (as shown in the drawings), and if the particular pose changes, the directional indication changes accordingly.

In addition, if terms “first”, “second” or the like are involved in the embodiments of the present disclosure, the terms are for illustrative purposes only and are not to be construed as indicating or imposing a relative importance or implicitly indicating the number of technical features indicated. Thus, a feature that limited by “first”, “second” may expressly or implicitly include at least one of the features. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present disclosure.

With the development of science and technology and the continuous improvement of people’s living standard, people have been accustomed to the visual experience brought about by the high-definition and smooth picture quality while the requirement for the display of the picture is getting higher and higher. However, when a mobile terminal is used for a video call, a picture quality for the video call is still limited to a level of 720P or less due to the network level or the mobile network cost, and becomes poor even when the video call is performed at a location where the signal coverage of the outdoor mobile network is poor. For example, when a network speed for a video call is not high enough, a software used for the video call may crop and enlarge a transmitted picture to ensure a normal progress of the video call, that is, one end user of the video call can only see a shoulder and an enlarged head of another end user of the video call after a picture of an upper half body of the another end user is enlarged where the upper half body can be seen by the one end user in an original video call. Alternatively, reduction of data of the video picture may be performed by reducing a transmission bit rate or a frame rate, and people cannot perform the video call with the smoothness and clarity of watching a video.

In order to solve the above problems, an embodiment of the present disclosure provides a virtual image video call method. According to the virtual image video call method provided in the present embodiment, when a poor network quality is detected in a process for a video call, a virtual image can be automatically invoked, and an interface for the video call is switched to the virtual image for display. A behavior action of the virtual image is obtained by mapping a current behavior action of the user collected by a sensor of a mobile terminal. Since the transmission data stream required by the virtual image is smaller, a video call with high picture quality and high frame rate can also be performed through the virtual image when the user is at a location where a network environment is poor, thereby obtaining a better video call experience. Further, the virtual image may vary from person to person, may be a preset template virtual image or a pre-generated virtual image including a user feature.

EXEMPLARY METHODS

First Embodiment

As shown in FIG. 1, an embodiment of the present disclosure provides a virtual video call method that can be used for a mobile terminal. In the embodiment of the present disclosure, the method includes following steps S100-S400.

At S100, one or more network quality indicators for a video call may be detected.

In the present embodiment, when a network quality is poor in a process for a video call of a user, which may deteriorate a picture quality of the video call, one or more network quality indicators are continuously detected in the process for the video call. Parameters representing the network quality indicators may include a packet loss rate, a delay, and a network speed, or the like. One or more modes for the detection may include real-time detection and detection at a fixed interval.

The method may further include: before detecting of the one or more network quality indicators, presetting one or more predetermined conditions for the network quality indicators, and when it is detected in the process of the video call that a network state for the video call meets the predetermined conditions, controlling an interface for the video call to be switched to a virtual image for display.

The virtual image used for a video call when the network quality indicators meet the predetermined conditions may be preset.

The predetermined conditions for the network quality indicators may be preset and means that, when the network quality indicators meet the predetermined conditions, it is considered that the network quality is poor, and then an interface that is currently displayed for the video call is controlled to be switched to a virtual image less dependent on the network quality for display. The network quality indicators are one or more parameters for reflecting a stability and a network signal strength for a current network, including but not limited to parameters such as a packet loss rate, a delay, and a network speed.

The predetermined conditions are to determine whether a current network speed is lower than a first value and/or whether a current packet loss rate is higher than a second value and/or detecting whether a current delay is higher than a third value. The first value, the second value and the third value are preset by a manufacturer or set by a user himself, respectively. When any one of the values or any combination of two or more of the values is met, the network quality is determined to be poor.

The virtual image used for replacing the interface of the video call when the network quality is poor may be preset. The setting of the virtual image may be provided by the large data, so that a user preselects and stores the virtual image that the user likes, the preselected virtual image may be directly invoked for display when it is detected that the network quality indicators meet the predetermined conditions. Alternatively, a unique virtual image may be automatically generated according to one or more appearance features of a user, and the use of the unique virtual image may be set.

For example, one or more parameters for indicating the network quality indicators, including a network speed, a packet loss rate, and a network delay, have been preset in a mobile phone A of a user A, and when any one of the network speed lower than 0.5 MB/s, the packet loss rate greater than 30%, and the network delay greater than 200 ms in the parameters for the network quality indicators is met, it is determined that the current network quality is poor. Appearance information of a body of a user A may be captured via a camera of the mobile phone A, including information such as five sense organs, a size of a head, a size of a neck, and a size of a shoulder, a virtual image with appearance features of the user may be automatically generated by using an algorithm, and stored in the mobile phone A in advance, and the virtual image may be configured to be preferentially switched for display when a poor network quality is detected in a process for a video call.

After the above preset operation/configuration is completed, when the user A and a user B are in a process for a video call, the mobile phone A detects a network speed, a packet loss rate, and a network delay in real time. For example, the network speed of 5 MB/s, the packet loss rate of 5%, and the network delay of 50 ms are detected once at some moment.

In order to further save the power consumption of the mobile phone and the accuracy of the network quality determination, it is possible to configure the network quality index to be detected once every certain interval, and the interval can be set by the user. Since each user has certain knowledge of the performance and signal strength of his mobile phone in its use process, the network of the mobile phone may only be deteriorated at a certain moment or within a short time. In combination with a user's habit, if the user may not consider a network fluctuation problem to affect a normal use of the mobile phone or the video call, then an interval for detecting the network quality indicators may be set longer. Alternatively, if a network of a mobile phone of some user may be worse in use than a network of other types of mobile phones because of a style of his mobile phone, which may cause the network of his mobile phone to be deteriorated for a long time as long as the environment of the network is fluctuated slightly, then an interval for detecting the network quality indicators may be set shorter, so as to timely switch an interface for the video call to a virtual image for display at an initial moment of deterioration of the network.

Not only the detection of the network quality indicators can be set by the user, but also the predetermined conditions for the network quality indicators for determining the network quality can be adjusted by the user according to the usage habit and usage feeling of the user. For example, when a user does not feel that the interface for the video call is stalled and the picture quality becomes seriously low in the process for the video call, the interface is suddenly switched to the virtual image, which means that the predetermined conditions at this time are set incorrectly. A user can freely set one or more predetermined conditions for parameters such as a network speed, a packet loss rate, a network delay, or other parameters through a setting interface, so as to ensure that the interface for the video call can be switched only when the user needs the interface to be switched.

Further, at step S200, whether the network quality indicators for the video call meet one or more predetermined conditions may be determined.

In this embodiment, when the network quality indicators are obtained, the mobile terminal compares the obtained network quality indicators with the predetermined conditions for the preset network quality indicators to determine whether each of the network quality indicators for the video call meets respective one of the predetermined conditions.

For example, the one or more predetermined conditions for the network quality indicators preset by the mobile phone A of the user A are that the network speed is lower than 0.5 MB/s, the packet loss rate is higher than 30%, and the network delay is higher than 200 ms, and when any one of the network quality indicators is set to meet respective one of the predetermined conditions, it means that the network quality indicators for the video call meet the predetermined conditions.

For example, if the user A detects at certain moment of the process for the video call that the network speed is 5 MB/s, the packet loss rate is 5%, and the network delay is 50 ms, all of the network speed, the packet loss rate, and the network delay do not meet the predetermined conditions for the preset network quality indicators, and the network quality at this time is considered to be normal. When it is detected at another moment that the network speed is 0.2 MB/s, the packet loss rate is 16%, and the network delay is 105 ms, the network speed in the network quality indicators meets the predetermined conditions, and it is determined that the network quality is poor.

Further, at step S300, when it is detected that the network quality indicators for the video call meet predetermined conditions, obtaining of a pre-generated virtual image of a call user may be controlled.

In the present embodiment, when it is detected in the process for the video call that the network quality indicators meet the predetermined conditions, that is, when it is detected that a current network speed is lower than the first value and/or a current packet loss rate is higher than the second value and/or it is detected that a current delay is higher than the third value, the virtual image of the call user pre-generated and stored in a storage space of the mobile terminal may be invoked.

For example, when the user A detects in the process for the video call that the network quality indicators meet predetermined conditions to determine that the network quality is poor, a virtual image representing a call user that is pre-generated and stored in the storage space of the mobile terminal may be invoked.

The pre-generated virtual image includes a template virtual image obtained by a user from large data, such as a male character template, a female character template, or another interesting virtual image including a kitten, a dog, and the like. Alternatively, the pre-generated virtual image may be a virtual image including one or more appearance features of a user generated by an algorithm according to user appearance information captured via a camera of the mobile phone, where the user appearance information includes information such as a head type, five sense organs, and a stature of the user.

In order to further enhance a distinguishing degree of different users when using one or more virtual images to make a call, a face of each of one or more call users currently performing a video call is recognized before obtaining the virtual image of the call user, so as to check whether the call user has respective one of preset virtual images in the mobile phone or not. If the call user has the preset virtual image in the mobile phone, the preset virtual image is directly invoked, otherwise, a template virtual image is allocated to the call user for use. Alternatively, a virtual image including one or more appearance features of a user temporarily generated by an algorithm according to user appearance information captured via a camera of the mobile phone may be stored in the mobile phone, so that the user can invoke the virtual image of the user when using the mobile phone again later.

Further, at step S400, an interface for the video call is switched to a virtual image mapped with a user behavior for display.

In this embodiment, after the pre-generated virtual image of the call user is invoked, the interface for the video call is switched to the virtual image for display. One or more user's behaviors may be captured by a camera or a sound sensor of a mobile terminal, including facial expression, limb movement, head shaking and rotation, and mouth movement obtained by sound recognition analysis. The user behaviors are mapped into a virtual image for display.

For example, after the mobile phone A of the user A invokes a pre-generated virtual image with one or more appearance features of the user A, a picture of opposite end of the video call relative to the mobile phone A of the user A is switched to a picture with the virtual image transmitted by the mobile phone A of the user A. At the same time, the mobile phone A of the user A captures one or more user's behavior via a front camera of the mobile phone A, that is, specifically recognizes a contour of the user's face and a contour of each of the nose, mouth, glasses and eyebrows as well as one or more behavior actions, such as detecting whether the user closes his eyes or opens the mouth by change of the area and shape of the contours, and determining whether the head of the user is rotated or not by change of the shape and area of the user's face, with an algorithm, and maps the captured and recognized behavior actions of the user into the virtual image, so that the behavior actions of the virtual image are consistent with the actions of the user, thereby improving call experience of both parties for the video call.

In view of advantages and disadvantages of the performance of the mobile phone, a method for the mobile phone to capture one or more user's behavior can be implemented only from sound, and the method is realized by recognizing conversation content and tone of the user from an obtained audio, and further converting the conversation content and the tone of the user into a mouth shape and facial expression, and mapping the conversation content and the tone of the user into a virtual image for display. The user's behaviors being obtained by the method greatly reduces the requirement of the virtual image video call on the processing performance of the mobile phone, and the use experience of both parties of the video call is ensured on the basis of loss of part of mobility of the virtual image.

The user may also customize a process for capturing one or more user's behaviors according to the performance of the mobile phone, including capturing only the rotation and shaking of the head and capturing only any one or more of the eyes, eyebrows, noses, and mouths for mapping, and maximizing mobility of the virtual image and smoothness of the video call.

Further, the method may include: after switching the interface for the video call to the virtual image, detecting one or more network quality indicators in a process for a virtual image call, and when the network quality indicators used for detecting the network quality are restored to normal values continuously for a preset time period, switching the virtual image to the interface for the video call. One or more modes of the detection include real-time detection and detection at a fixed interval. The real-time detection can timely switch interface for the video call according to the network quality indicators, and the detection at the fixed interval can reduce processing capability requirements of the processor and reduce energy consumption.

For example, it is preset that, when the network quality indicators continue to restore to normal values within 30 seconds, that is, the predetermined conditions are not met, it is determined that the current network quality is normal. When it is detected in a process for a user A performing a video call with a virtual image that the network speed is 1.5 MB/s, the packet loss rate is 10%, and the network delay is 99 ms, if no network quality indicators meet the predetermined conditions within 30 seconds from this moment, it is determined that the network quality is restored to a normal state, and the mobile phone A switches the virtual image to a normal interface for the video call.

According to the above embodiment, the mobile terminal may detect the network quality in the process for the user to perform the video call, automatically switch the interface for the video call to a virtual image interface for display when it is determined that the network quality is poor, and map one or more user's behavior and actions into the virtual image for display in real time via the camera and/or the sound sensor of the mobile terminal. With the method of replacing the interface for the video call interface with the virtual image having a small data flow requirement, the user can still maintain a clear and smooth call picture when the network quality is poor.

Second Embodiment

As shown in FIG. 2, a virtual image video call switching method may be provided in the second embodiment and include following steps A100-A300.

At step A100, whether an instruction for making a video call using a virtual image is received may be detected when it is monitored that a video call request is received or transmitted.

In the present embodiment, when it is monitored by the mobile terminal that the video call request is received or transmitted, it is detected whether the user needs to make the video call using the virtual image.

The virtual image video call switching method may include: before monitoring receiving or transmitting of the video call request, presetting a virtual image for the video call or presetting an algorithm for automatically generating the virtual image according to one or more user features.

For example, when a user B makes a video call or receives a video call request from another user through a mobile phone B, the mobile phone B detects whether the video call needs to be made using the virtual image, that is, detects whether an instruction for making a video call using the virtual image is received. One or more manners of the detection may include: displaying an interaction window determining whether the virtual image is used for the video call on a display screen of the mobile phone B, or detecting whether the user B presets the virtual image to be used for the video call by default.

Before the user B makes the video call or receives the video call request from another user through the mobile phone B, a virtual image for the video call is preset, where the virtual image can be downloaded and stored through big data, including a male character template, a female character template, or some interesting virtual image such as a kitten, a dog, or even some colas or boxes having eyes and mouths that are not otherwise biometric, for example. Alternatively, an algorithm for automatically generating a virtual image according to one or more user features is preset, where the algorithm needs to be combined with one or more appearance features of the user captured by a camera of a mobile terminal to generate the virtual image, and the virtual image having appearance features of a user may be pre-generated by the user and stored, or the mobile terminal may generate and display the virtual image with the appearance features in real time in a process of performing a virtual image video call.

Further, at step A200, when it is detected that the instruction for making the video call using the virtual image is received, the virtual image is invoked or generated, and behavior of the user is mapped into the virtual image.

In the present embodiment, when it is detected that the user needs to make a video call using the virtual image, the virtual image including the appearance features of the user is invoked or generated, and the behavior of the user is mapped into the virtual image.

For example, when it is detected that the user B selects an operation instruction that a video call needs to be performed using a virtual image, or the user B presets the virtual image to be acquiescently or limitedly used for the video call in the mobile phone B, invoking of a virtual image that is preselected and stored in the mobile phone B is controlled, or a virtual image that has one or more appearance features of the user is generated through a pre-stored algorithm. A step for mapping behavior of the user into the virtual image is performed as described in the first embodiment. The method can enable the user to select whether to use the virtual image to make the video call before starting of the video call, a plurality of types of virtual images are used to make the video call interesting, and the video call can be kept confidential according to the use requirements of the user.

Further, at step S300, it is detected that the video call is successfully established, and the virtual image mapped with the behavior of the user is displayed in a picture of the video call.

In the present embodiment, after it is detected that the video call is successfully established, the video or the virtual image transmitted by an opposite end user is received by a local end user, while the virtual image mapped with the behavior of the local end user is also invoked by the local end user and displayed in the picture of the video call of the opposite end user. At the same time, not only the virtual image can be set to be used and closed by the local end user himself, but also the local end user can ask opposite end user to use the virtual image to interact with each other, which can increase the interest of the video call and make the virtual image more clearly and smoothly and save the network traffic more than the video.

Third Embodiment

The method of the present disclosure is described in further detail below by a specific application embodiment.

An example in which the mobile terminal is a mobile phone may be taken in the specific application embodiment. As shown in FIG. 3, the virtual image video call method of the specific application embodiment may include following steps S10-S20.

At step S10, the method starts and proceeds to step S11.

At step S11, an operator captures or supplements an image of a user when the user creates a card in an operator's business hall, and the method proceeds to step S12.

At step S12, the operator generates a virtual image having one or more appearance features of the user according to the captured image of the user with an algorithm, and the method proceeds to step S13.

At step S13, the operator stores the virtual image into an Subscriber Identity Module (SIM) card or binds the virtual image to the SIM card through a network server, and the method proceeds to step S14.

At step S14, when it is detected that a user uses the SIM card to make a video call, the user transmits the virtual image preset in the SIM card to an opposite end user according to the requirement of whether the user uses the virtual image, and the method proceeds to step S15.

At step S15, an opposite end user for the video call receives the virtual image, and the method proceeds to step S16 and step S17.

At step S16, the virtual image received over a network is displayed, and the method proceeds to step S20.

At step s17, a calling number or the virtual image for the video call may be stored and remarked according to the requirement of the opposite end user for video call.

At step S20, the method ends.

As can be seen from the above in the specific application embodiment of the present disclosure that one or more appearance features of the user may be captured in the operator's business hall, and the virtual image having the same appearance features as the user himself may be generated and bound to the SIM card. The virtual image can be transmitted to a display screen at an opposite end during a video call, thereby playing a privacy and confidentiality function, and can be stored and remarked like a name and a telephone number.

A user C creates a SIM card in an operator's business hall, and an operator staff captures appearance information of the user C, including at least a head size and features of five sense organs. A virtual image including the appearance information of the user C is automatically generated according to the captured appearance information of the user C, and is bound to the SIM card by storing the virtual image of the user C into the SIM card or by means of a network server. When the SIM card is inserted into a mobile phone C by the user C, the mobile phone C can obtain the virtual image through the SIM card in addition to making a call through the SIM card. When it is detected that the user C is about to make a video call or is in a video call, the virtual image is freely switched for display according to the requirement of the user C. For example, if the current network is poor and the high definition video call cannot be performed, the virtual image with a small network speed requirement can be switched to continue the video call. Alternatively, when the user C receives a video call request of an unfamiliar person or an interesting video call request between the user C and a friend, the video call is performed by manually switching the interface for the video call to the virtual image for listening. When an opposite end for the video call receives the virtual image transmitted over the Internet, the virtual image of the user C is displayed on a display of a terminal device of the opposite end, and further the virtual image of the user C can be stored and edited like the mobile phone number.

By the above-described embodiments, each user can have a unique virtual image, and select a video call and a virtual image call according to user requirements such as poor network or for privacy considerations, thereby improving user experience and security.

Based on the embodiments described above, a terminal device may be further provided in yet another embodiment of the present disclosure, of which a schematic structural diagram can be shown in FIG. 4. The terminal device includes a processor, a memory, a network interface, and a display screen connected through a system bus. The processor of the terminal device is configured to provide computing and control capabilities. The memory of the terminal device includes a non-volatile storage medium and an internal memory. The non-volatile storage medium stores an operating system and a computer program. The internal memory provides an environment for the operation of the operating system and the computer program in the non-volatile storage medium. The network interface of the terminal device is configured to be in communication with an external terminal through a network connection. The computer program, when executed by the processor, implements a virtual image video call. The display screen of the terminal device may be a liquid crystal display screen or an electronic ink display screen.

It should be understood by those skilled in the art that the schematic structural diagram in FIG. 4 is merely a block diagram of a portion of the structure associated with the solution of the present disclosure and does not constitute a definition of the terminal device to which the solution of the present disclosure is applied. A particular terminal device may include more or fewer components than shown, or some combination of components, or have different arrangements of components.

A terminal device is provided in an embodiment, includes: a memory, a processor, and a virtual image video call program stored on the memory and operable on the processor, where the process performs operations including:

detecting one or more network quality indicators in a process for a video call;

determining whether the one or more network quality indicators for the video call meet one or more predetermined conditions;

when it is detected that the one or more network quality indicators for the video call meet the one or more predetermined conditions, controlling a pre-generated virtual image of a call user to be obtained; and switching an interface for the video call to the virtual image mapped with behavior of the user for display.

The operations may further include: before detecting of the one or more network quality indicators, presetting one or more predetermined conditions for the one or more network quality indicators, and when it is detected in the process for the video call that a network state for the video call meets the predetermined conditions, controlling an interface for the video call to be switched to the virtual image for display; and presetting the virtual image used for the video call when the one or more network quality indicators meet the one or more predetermined conditions.

The determining of whether the one or more network quality indicators for the video call meet the one or more predetermined conditions includes:

the one or more network quality indicators comprising a network speed, a packet loss rate, and a delay, detecting at least one of: whether the network speed is lower than a first value, whether the packet loss rate is higher than a second value, or whether the delay is higher than a third value.

The controlling the pre-generated virtual image of the call user to be obtained includes:

when at least one of following items is detected: the network speed is lower than the first value, the packet loss rate is higher than the second value, or the delay is higher than the third value, controlling the pre-generated virtual image of the call user to be invoked.

The switching of the interface for the video call to the virtual image includes:

switching an interface for the video call to a virtual image for display;

capturing behavior of a user through at least one of a camera or a sound sensor of a mobile terminal; and mapping the behavior of the user into the virtual image for display.

The detecting of the one or more network quality indicators includes:

detecting the one or more network quality indicators in the process for the video call in real time or at a fixed interval.

The one or more predetermined conditions are set by a user based on a usage habit and a usage feeling.

The operations further include: before the controlling of the pre-generated virtual image of the call user to be obtained, recognizing a face of each of one or more call users currently performing the video call is recognized to check whether the call user has respective one of preset virtual images; in response to the call user having the preset virtual image, invoking the preset virtual image directly; and in response to the call user not having the preset virtual image, allocating a template virtual image to the call user for the video call.

If the call user does not have the preset virtual image, a virtual image including one or more appearance features of the call user is generated and stored by an algorithm based on to appearance information of the call user captured by a camera of a terminal, to enable the call user to invoke the preset virtual image of the call user when the call user makes the video call again later.

The operations further include: after the switching of the interface for the video call to the virtual image includes:

detecting one or more network quality indicators in a process for a virtual image call, and when the one or more network quality indicators are restored to normal values continuously for a preset time period, switching the virtual image to the interface for the video call.

It should be understood by those of ordinary skill in the art that all or a portion of the flows of implementing the methods of the embodiments described above may be accomplished by a computer program instructing relevant hardware that may be stored in a non-volatile computer-readable storage medium that, when executed, may include the flows of the method embodiments described above. Any reference to memory, storage, database or other medium used in the embodiments provided in the present disclosure may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, the RAM may be available in a variety of forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) RAM (RDRAM), direct memory bus dynamic RAM (DRDRAM), and memory bus dynamic RAM (RDRAM).

In summary, a virtual image video call method, a terminal device, and a storage medium are provided. The method includes: detecting one or more network quality indicators in a process for a video call; determining whether the one or more network quality indicators for the video call meet one or more predetermined conditions; when it is detected that the one or more network quality indicators for the video call meet the one or more predetermined conditions, controlling a pre-generated virtual image of a call user to be obtained; and switching an interface for the video call to the virtual image mapped with behavior of the user for display. The purpose of the present disclosure is to solve the problems that, when a user makes a video call using a mobile terminal, the network quality is deteriorated, and the video call can only be maintained by a method of reducing the image quality, resulting in deterioration of the user experience. By automatically switching the interface for the video call to the preset virtual image for display when it is detected that the network quality is deteriorated in the process of the video call of the user, the display effect of high definition and smoothness can also be maintained when the network is poor, thereby improving the user experience.

A plurality of NFC desk phones with NFC tags and NFC functions are preset for placement at different stations, and an NFC wearable device is preset for each user, and a correspondence between the NFC wearable device of each user and the number of the NFC desk phone of the user is established. When there is an incoming telephone call, an NFC wearable device corresponding to an incoming telephone extension number is searched for. An NFC wearable device corresponding to an incoming telephone extension number obtains an NFC desk phone closest to the NFC wearable device. the incoming call is controlled to be switched to the NFC wearable device corresponding to the extension number of the incoming call, and the NFC desk phone at the nearest station is rung. The present disclosure aims to solve the problem that a fixed telephone cannot receive an incoming call at anytime and anywhere, so that an enterprise user can also receive a call to himself or herself through a desk phone on another station when leaving a station of the enterprise user, thereby achieving the purpose of enabling the incoming call to seek people and improving the office efficiency.

It should be understood that the application of the present disclosure is not limited to the above examples, and that modifications or changes may be made to those of ordinary skill in the art in light of the above description, all of which are intended to fall within the scope of the claims appended to the present disclosure.

What is claimed is:

1. A virtual image video call method, comprising:

detecting one or more network quality indicators in a process for a video call;

determining whether the one or more network quality indicators for the video call meet one or more predetermined conditions;

controlling a pre-generated virtual image of a call user to be obtained when it is detected that the one or more network quality indicators for the video call meet the one or more predetermined conditions; and switching an interface for the video call to the virtual image mapped with behavior of the user for display;

wherein the one or more network quality indicators comprise at least one of a network speed, a packet loss rate, and a delay, and detecting the one or more network quality indicators in real time or at a fixed interval;

when at least one of the following conditions is detected: the network speed is lower than a first threshold, the packet loss rate is higher than a second threshold, or the delay is higher than a third threshold, controlling the pre-generated virtual image to be invoked, and after switching to the virtual image, detecting the one or more network quality indicators again in a virtual image call process, and when the indicators are restored to normal values continuously for a preset time period, switching the virtual image back to the interface for the video call;

wherein after detecting that the network quality meets a predetermined switching condition, the invoked virtual image comprises a preset virtual image corresponding to appearance features of the user; and when no corresponding preset virtual image is detected, generating and storing a new virtual image based on appearance information of the user captured by a camera of the terminal for subsequent video calls;

wherein, after switching to the virtual image, user behavior is captured through a camera and/or a sound sensor, and at least one of mouth shape, facial expression, head movement, or limb movement is mapped to the virtual image.

2. The method of claim 1, further comprising: before detecting of the one or more network quality indicators, presetting one or more predetermined conditions for the one or more network quality indicators, and controlling an interface for the video call to be switched to the virtual image for display when it is detected in the process for the video call that a network state for the video call meets the predetermined conditions; and presetting the virtual image used for the video call when the one or more network quality indicators meet the one or more predetermined conditions.

3. The method of claim 2, wherein the determining of whether the one or more network quality indicators for the video call meet the one or more predetermined conditions comprises:

the one or more network quality indicators comprising a network speed, a packet loss rate, and a delay, detecting at least one of: whether the network speed is lower than a first value, whether the packet loss rate is higher than a second value, or whether the delay is higher than a third value.

4. The method of claim 3, wherein the controlling the pre-generated virtual image of the call user to be obtained comprises:

controlling the pre-generated virtual image of the call user to be invoked when at least one of following items is detected: the network speed is lower than the first value, the packet loss rate is higher than the second value, or the delay is higher than the third value.

5. The method of claim 1, wherein the switching of the interface for the video call to the virtual image comprises:

switching an interface for the video call to a virtual image for display;

capturing behavior of the user through at least one of a camera or a sound sensor of a mobile terminal; and mapping the behavior of the user into the virtual image for display.

6. The method of claim 1, wherein the detecting of the one or more network quality indicators comprises:

detecting the one or more network quality indicators in the process for the video call in real time or at a fixed interval.

7. The method of claim 1, wherein the one or more predetermined conditions are set by the user based on a usage habit and a usage feeling.

8. The method of claim 1, further comprising: before the controlling of the pre-generated virtual image of the call user to be obtained, recognizing a face of each of one or more call users currently performing the video call is recognized to check whether the call user has respective one of preset virtual images; in response to the call user having the preset virtual image, invoking the preset virtual image directly; and in response to the call user not having the preset virtual image, allocating a template virtual image to the call user for the video call.

9. The method of claim 8, further comprising:

in response to the call user not having the preset virtual image, generating and storing a virtual image including one or more appearance features of the call user by an algorithm based on to appearance information of the call user captured by a camera of a terminal, to enable the call user to invoke the preset virtual image of the call user when the call user makes the video call again later.

10. The method of claim 1, further comprising: after the switching of the interface for the video call to the virtual image, detecting one or more network quality indicators in a process for a virtual image call, and switching the virtual image to the interface for the video call when the one or more network quality indicators are restored to normal values continuously for a preset time period.

11. A virtual image video call switching method, comprising:

detecting whether an instruction for making a video call using a virtual image is received when it is monitored that a video call request is received or transmitted;

invoking or generating the virtual image when it is detected that the instruction for making the video call using the virtual image is received, and mapping behavior of the user into the virtual image; and displaying the virtual image mapped with the behavior of the user in a picture of the video call when it is detected that the video call is successfully established;

wherein the one or more network quality indicators comprise at least one of a network speed, a packet loss rate, and a delay, and detecting the one or more network quality indicators in real time or at a fixed interval;

when at least one of the following conditions is detected: the network speed is lower than a first threshold, the packet loss rate is higher than a second threshold, or the delay is higher than a third threshold, controlling the pre-generated virtual image to be invoked, and after switching to the virtual image, detecting the one or more network quality indicators again in a virtual image call process, and when the indicators are restored to normal values continuously for a preset time period, switching the virtual image back to the interface for the video call;

wherein after detecting that the network quality meets a predetermined switching condition, the invoked virtual image comprises a preset virtual image corresponding to appearance features of the user; and when no corresponding preset virtual image is detected, generating and storing a new virtual image based on appearance information of the user captured by a camera of the terminal for subsequent video calls;

wherein, after switching to the virtual image, user behavior is captured through a camera and/or a sound sensor, and at least one of mouth shape, facial expression, head movement, or limb movement is mapped to the virtual image.

12. The method of claim 11, further comprising: before monitoring receiving or transmitting of the video call request, presetting a virtual image for the video call or presetting an algorithm for automatically generating the virtual image based on one or more appearance features of the user.

13. The method of claim 11, wherein the displaying of the virtual image mapped with the behavior of the user comprises:

controlling a sound sensor to capture a sound of the user after it is detected that the video call is successfully established, and recognizing a mouth shape corresponding to the sound and an emotion of the user when speaking by a speech recognition algorithm; and controlling the recognized mouth shape and emotion to be mapped into a face action of the virtual image for display.

14. A terminal device, comprising: a memory, a processor, and a virtual image video call program stored on the memory and operable on the processor, wherein the virtual image video call program, when executed by the processor, implements operations comprising:

detecting one or more network quality indicators in a process for a video call;

determining whether the one or more network quality indicators for the video call meet one or more predetermined conditions;

controlling a pre-generated virtual image of a call user to be obtained when it is detected that the one or more network quality indicators for the video call meet the one or more predetermined conditions; and switching an interface for the video call to the virtual image mapped with behavior of the user for display;

wherein the one or more network quality indicators comprise at least one of a network speed, a packet loss rate, and a delay, and detecting the one or more network quality indicators in real time or at a fixed interval;

when at least one of the following conditions is detected: the network speed is lower than a first threshold, the packet loss rate is higher than a second threshold, or the delay is higher than a third threshold, controlling the pre-generated virtual image to be invoked, and after switching to the virtual image, detecting the one or more network quality indicators again in a virtual image call process, and when the indicators are restored to normal values continuously for a preset time period, switching the virtual image back to the interface for the video call;

wherein after detecting that the network quality meets a predetermined switching condition, the invoked virtual image comprises a preset virtual image corresponding to appearance features of the user; and when no corresponding preset virtual image is detected, generating and storing a new virtual image based on appearance information of the user captured by a camera of the terminal for subsequent video calls;

wherein, after switching to the virtual image, user behavior is captured through a camera and/or a sound sensor, and at least one of mouth shape, facial expression, head movement, or limb movement is mapped to the virtual image.

15. The terminal device of claim 14, wherein the processor is further configured to perform the operations comprising:

presetting one or more predetermined conditions for the one or more network quality indicators, and controlling an interface for the video call to be switched to the virtual image for display when it is detected in the process for the video call that a network state for the video call meets the predetermined conditions; and presetting the virtual image used for the video call when the one or more network quality indicators meet the one or more predetermined conditions.

16. The terminal device of claim 15, wherein the processor is further configured to perform the operations comprising:

the one or more network quality indicators comprising a network speed, a packet loss rate, and a delay, detecting at least one of: whether the network speed is lower than a first value, whether the packet loss rate is higher than a second value, or whether the delay is higher than a third value.

17. The terminal device of claim 16, wherein the processor is further configured to perform the operations comprising:

controlling the pre-generated virtual image of the call user to be invoked when at least one of following items is detected: the network speed is lower than the first value, the packet loss rate is higher than the second value, or the delay is higher than the third value.

18. The terminal device of claim 14, wherein the processor is further configured to perform the operations comprising:

switching an interface for the video call to a virtual image for display;

capturing behavior of a user through at least one of a camera or a sound sensor of a mobile terminal; and mapping the behavior of the user into the virtual image for display.

19. The terminal device of claim 14, wherein the processor is further configured to perform the operations comprising:

detecting the one or more network quality indicators in the process for the video call in real time or at a fixed interval.

* * * * *